Feb. 8, 1966 A. NICKL ETAL 3,233,264
APPARATUS FOR WASHING MOTOR CARS AND THE LIKE
Filed May 27, 1964 3 Sheets-Sheet 1

INVENTOR.
Alois Nickl
Ulrich von Külmer
BY

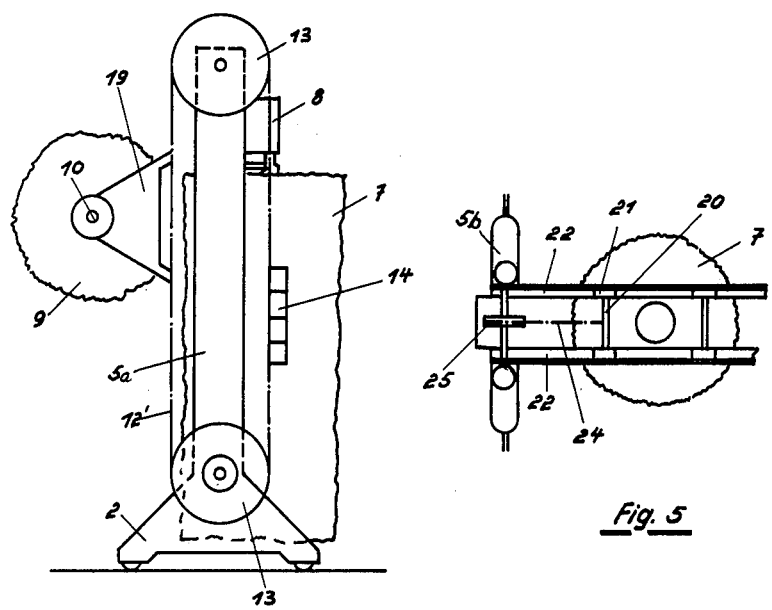
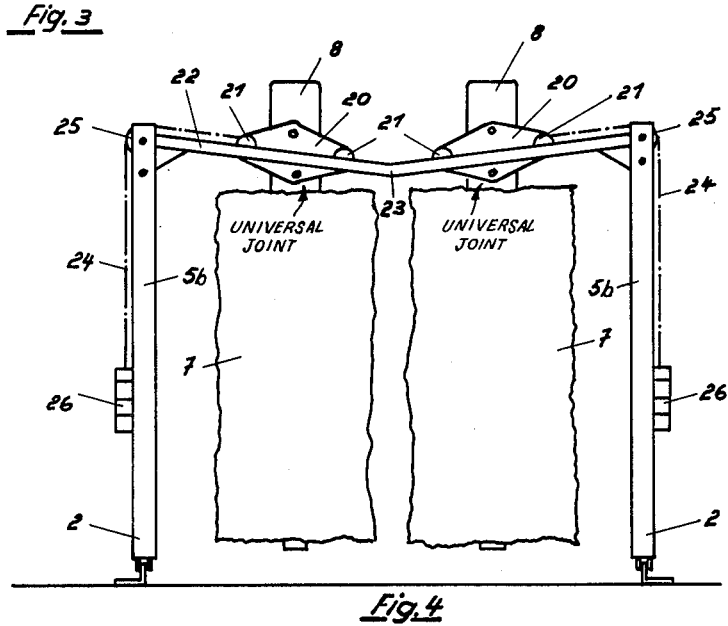

United States Patent Office 3,233,264
Patented Feb. 8, 1966

1

3,233,264
APPARATUS FOR WASHING MOTOR CARS
AND THE LIKE
Alois Nickl, Augsburg, and Ulrich von Külmer, Friedberg, near Augsburg, Germany, assignors to Hermann Wohrl, Augsburg, Germany
Filed May 27, 1964, Ser. No. 370,600
Claims priority, application Germany, May 28, 1963, N 23,230; Sept. 18, 1963, N 23,767; Nov. 26, 1963, N 24,080; Feb. 29, 1964, N 52,244
7 Claims. (Cl. 15—21)

The invention relates to apparatus for washing motor cars and the like, which employs a device comprising a plurality of rotating brushes moving along a stationary vehicle.

In washing apparatus of this kind it is known to mount the rotating brushes on an upright frame-like chassis by which the vehicle is surrounded, in such manner that a horizontally mounted brush moves over the top surface areas, and at least two pairs of vertical brushes mounted on opposite sides move over the side faces of the vehicle, and, as they do so, are supplied with washing liquid. Such washing apparatus requires a considerable number of structural parts, a large amount of space and substantial expenditure and is moreover not able to treat the vehicle adequately at all external positions thereof.

It is one of the objects of the invention to obtain the the maximum washing effect at the minimum expense. This is achieved in that a device, comprising three brushes at most, is moved to and fro along the exposed faces of the car.

As far as the construction is concerned, it is a further object of the invention to reduce the expenses of the drive and the power requirements substantially as compared with those of known apparatus.

It is a further object of the invention to provide washing apparatus of the smallest possible construction which can be inserted into existing smaller spaces than required heretofore and is nevertheless capable of washing large vehicles.

It is also an object of the invention to enable both the smallest and the largest passenger cars to be washed with the same apparatus without having to carry out alterations or adjustments.

Finally, it is an object of the invention to provide a control device of improved construction by which the same washing effect may be obtained both during the feed movement and during the return movement of the apparatus, and by which the negative influences otherwise experienced are avoided.

The idea of mounting the horizontal brush in the manner of a hoist ensures that merely by its rotational movement, combined with the feed movement of the complete washing apparatus, the brush climbs up over the car and a special hoisting gear for the brush is dispensed with.

The invention is diagrammatically illustrated by way of example in the accompanying drawings, in which:

FIGURE 3 is a side elevation of a modified construction of the washing apparatus illustrated in FIGURE 1;

FIGURE 4 is a front elevation of a modified washing apparatus provided with suspended brushes;

FIGURE 5 is a partial plan of the apparatus illustrated in FIGURE 4; and

2

Figure 1:
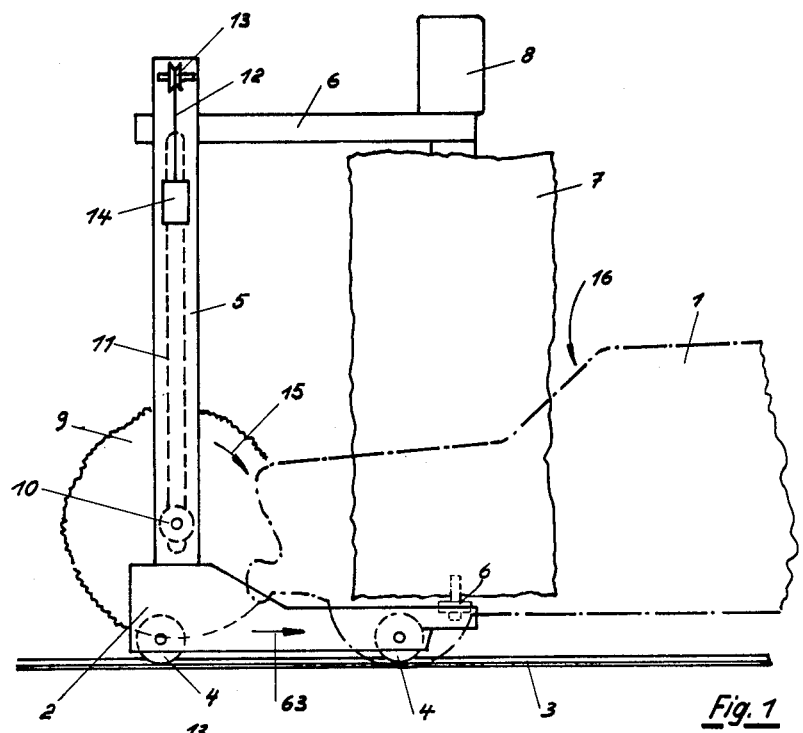
FIGURE 1 is a side elevation of washing apparatus according to the invention.

FIGURE 1 shows by way of example a side elevation of a passenger car 1 (dot-dash lines), in which the forwardly and rearwardly extending upper surfaces of the car body are to be cleaned by a rotating brush 9 mounted on a horizontal axis. The side faces of the vehicle 1 are cleaned by brushes 7 mounted on vertical axes at an adequate distance forwardly of or to the rear of the horizontal brush 9.

In this construction, the bearing 10 is merely shown by way of a symbol. It is mounted on a guide 11 of a chassis 5 of inverted U-section, which is moved by a wheeled carriage 4 on rails 3 extending parallel to both side walls of the vehicle 1.

The brush 9 moves freely up and down with its chain or cable 12 with the aid of balance weights 14, it being possible for the flexible control element 12, which is guided over guide pulleys 13, to be either endless or of limited length.

Assuming the chassis 2 to be in the extreme left-hand position, in which the horizontal brush 9 is in its lowermost position, then the chassis 2 is moved past the stationary vehicle 1 in the direction of the arrow 63 while the brush 9 rotates in the direction of the arrow 15. The hoist-like suspension assembly 12, 14 enables the brush 9 to move automatically up and down, the driving forces for the up-and-down movement being derived from the feed movement of the chassis 2 in the direction of the arrow 63 and from the rotation of the brush 9 in the direction of the arrow 15. By its rotation in this sense, the brush 9 is caused to function as a climbing brush which works itself automatically upwards along the surface 16 of the body of the stationary car, and actually climbs across the body of the vehicle 1. The upright brushes 7, however, are mounted in swinging arms 6 and driven by their own motors 8. The brushes 7 are pressed against the side faces of the vehicle 1.

Figure 2:
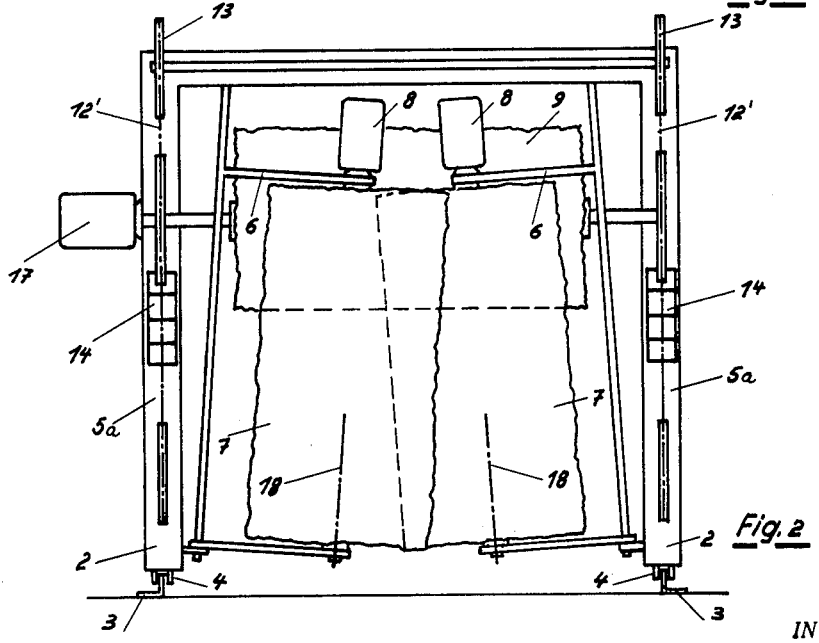
FIGURE 2 is a corresponding but slightly modified front elevation.

In the construction illustrated in FIGURE 2, the limited-length chain hoist 12 shown in FIGURE 1 is replaced by an endless chain or cable hoist 12' which, as illustrated in FIGURE 3, passes around guide pulleys 13; one section of the chain or cable hoist carries the brush 9, the other section carrying detachable balance weights 14, the mass of which may be varied. An independent driving motor 17 for the horizontal brush is also shown in FIG. 2.

In accordance with FIG. 2, the axes of the vertical brushes 7 are inclined from the vertical as indicated by the dash-and-dot lines 18, so that a specific pressure may be applied to the side faces of the vehicle by, for example, the weight of the brushes and their motors without extraneous assistance.

FIGURE 3 shows the brush 9 to be mounted in a bearing bracket 19 laterally offset from the chain 12'. This construction affords the advantage that the chassis 2, 5 may be of relatively small size.

In the construction illustrated by way of example in FIGURES 4 and 5, two suspended vertical brushes 7 are shown, the chassis 5b in this construction being also generally of U-section. At the position 23 at which the cross-beams 22 meet, a bend is formed so that a trolley 20 guided on the cross-beams 22 has a tendency to move into that bend. This movement is counteracted by a counter-balance 26 which is provided on a chain 24 guided over pulleys 25, and which may be adjusted so that the mass of the brush 7 slightly exceeds that of the counter-balance 26. A single trolley 20 for each brush 7 slides on rollers 21 along the cross-beam sections 22.

At the beginning of the washing operation, the two suspended brushes 7 assume approximately the position illustrated in FIGURE 4. As soon as the driving motor 8 is started, the brushes 7 begin to work along the front face of the motor car 1. In order to avoid failure of overlap of the brushes 7 over this area, they are advantageously first moved to and fro laterally before the frame 5b is moved longitudinally along to the motor car 1, the brushes 7 thereby traveling around the edges of the motor car 1, and then washing the side faces of the car 1. The treatment of the rear faces of the motor car corresponds to that of the front face.

In the arrangement of the brushes as illustrated, the roof surface of the motor car 1 cannot be washed. An additional horizontal brush, illustrated at 9 in FIGURE 1, may be used for this purpose. The horizontal brush can, however, also treat the front and rear faces of the motor car 1, so that a twofold, or even a threefold cleaning is effected at these locations. This is of particular importance, since a considerable amount of dirt accumulates particularly on the front face of motor cars.

The trolley 20 may advantageously also be provided with a drive, for example in the form of a winch drive, for the purpose of moving the trolley 20 laterally along the cross-beam 22 in a specific optional manner, for example in order to ensure overlap of the brushes 7, or for washing the front or rear face of the motor car 1 repeatedly by reciprocating the brushes 7 laterally before treating the side faces of the motor car.

Finally, in accordance with the invention, the brushes may be hinged to their trolleys 20. Since the rotation of the brushes must not be hindered by the articulation, a universal joint construction may be used. It is, however, also possible for the bearing bushes to be jointly and flexibly guided, and for the drive to be effected by universal joint shafts. Flexible mounting of the brushes 7 would result in their being enabled to move clear of projecting parts of the motor car 1 without impairing the guidance of the trolley 20 on the cross-beam 22.

It will be understood that the vertical brushes 7 may be mounted in such manner that their bristles mesh with each other, at least initially.

Figure 6:
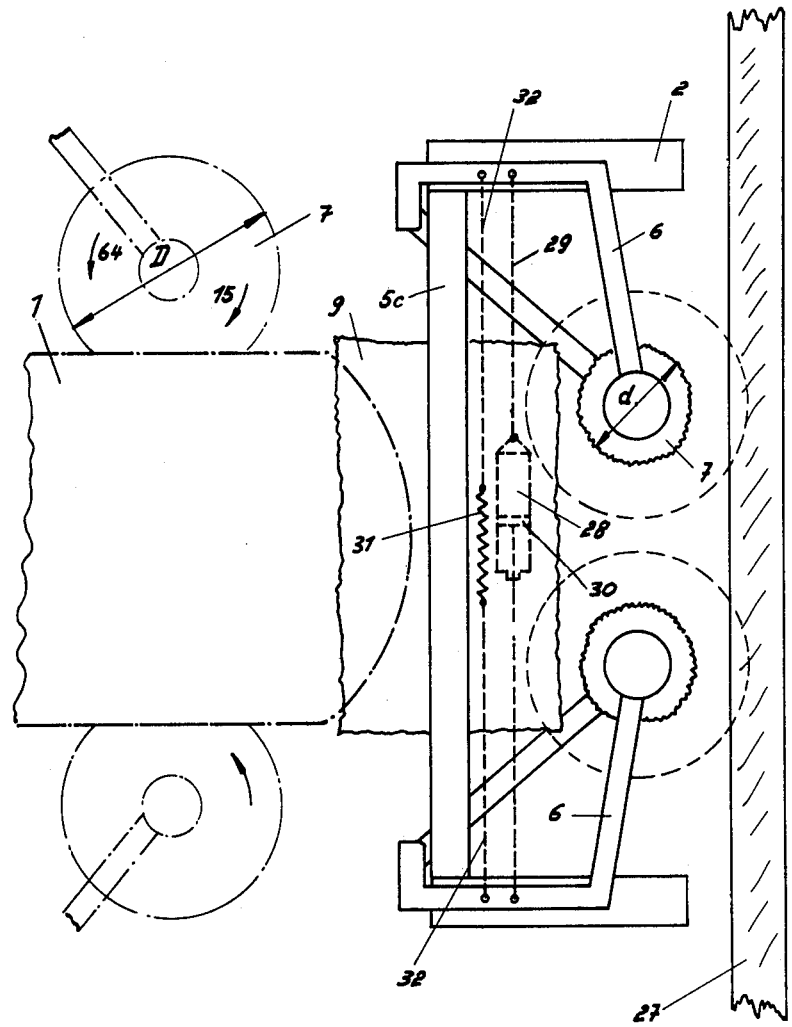
FIGURE 6 is a diagrammatic plan view of a further modification of the washing apparatus.

In the construction illustrated in FIGURE 6, the pattern of motion of each vertical brush 7 is of interest. In this construction, it makes no difference with which one of the other brushes or other washing device the brush cooperates. The single vertical brush 7 is mounted on a swinging arm 6. When the rotation of the single brush 7 is stopped, it assumes the relatively small diameter $d$ indicated in full lines in the right-hand part of FIGURE 6.

When the brush 7 rotates, centrifugal force spreads the bristles and it assumes the substantially increased diameter $D$, as for example, illustrated in dash-and-dot lines in the left-hand part of FIGURE 6.

The vertical brush 7 is pressed either by the action of a spring 31 or, when the axis is disposed at an angle, by its own weight against the side faces of the vehicle 1. If two brushes 7 are provided, the spring 31 is advantageously provided between the two swinging arms 6 of the brushes 7 in the form of a tension spring with appropriate connecting members 32.

Moreover, the construction illustrated in FIGURE 6 shows a force generator 28, 29, 30 consisting of a cylinder 28 which is connected by a guide 29 to a swinging arm 6'. The piston 30 of the pressure cylinder is, however, linked to the other swinging arm 6', so that admission of a pressure medium to the cylinder 28 results in the swinging arm 6' being swung apart against the action of the spring 31.

The fluid-responsive cylinder arrangement 28, 29, 30 shown in FIGURE 6 has for its purpose to maintain the contact pressure applied by the brush moving to and fro along the side face of the car 1, substantially constant. When the rotating brush 7 is carrying out the washing operation in the position indicated in dash-and-dot lines, the contact pressure is varied in dependence upon the direction of rotation of the brush 7. On the one hand, the brush 7 is pressed by the spring 31 at a constant force against the vehicle 1. However, when the brush rotates in the direction of the arrow 15, the pressure applied by the spring 31 is reduced by the centrifugal action of the individual bristles and by the effect of the force of reaction of the surface of the stationary vehicle. On the other hand, when the brush 7 rotates in the direction of the arrow 64, the force applied is slightly reduced, and the effective force applied by the brush in general is greater than in the other case with the brush rotating in the direction of the arrow 15.

With the aid of the fluid-responsive cylinder arrangement 28, 29, 30 it is possible to maintain the force applied constant, in that the undesirable force generated by reversal of the direction of rotation is counteracted to a corresponding extent. Thus, as the chassis 5c is moving from the illustrated position to the position shown in broken lines, one may start with the brush rotating in the direction of the arrow 64, the force-producing means 28 being thus moved to its outer position to prevent the brush from being pressed excessively against the car 1. Upon reversal of the direction of feed, the direction of rotation is reversed also, so that the increased lifting-off force of the brush resulting from rotation in the direction of the arrow 15 becomes effective. In this case, the force producing means is rendered inoperative.

The mechanism 6', 31 enables the brush 7 to be swung inwards to such an extent that it comes to lie in front of the horizontal brush 9. If the drive is controlled in such manner that the vertical brushs 7 are prevented from rotating until they have been brought by the chassis 5c to the car 1, a considerable amount of space between the wall 27 of the building and the washing apparatus, in its initial position, may be saved and large vehicles may be washed in small spaces.

Instead of providing the force-producing means 28, locking mechanisms, stops or other gear may be provided for the purpose of preventing the brush 7 from continuing to swing in the direction of the motor car 1, if there is a risk of reversal of the direction of rotation of the brush 7 resulting in the application of excessive pressure.

We claim:

1. In an apparatus for washing automotive vehicles wherein brush means sweep along top and side surfaces of a vehicle while said surfaces are treated with a washing liquid, the improvement which comprises:

an upright support frame lying in a plane transverse to the vehicle and provided with wheel means for longitudinal displacement of said frame along said vehicle while said vehicle remains stationary;

a brush mounted on said frame for rotation about a substantially horizontal axis and extending athwart said frame for engagement with said top surface of said vehicle upon displacement of said frame therealong;

guide means on said frame for confining said brush to linear vertical movement substantially solely by the reaction force of rolling engagement thereof with said top surface of said vehicle during longitudinal displacement of said frame;

counterweight means on said frame and flexible means connecting said counterweight means with said brush for balancing at least part of the weight thereof; and drive means on said frame for rotating said brush about its axis.

2. The improvement defined in claim 1 which further comprises:

a pair of further brushes mounted on said frame for rotation about respective generally upright axes and engageable with respective opposite side surfaces of said vehicle; and respective support members on said frame and carrying said further brushes while being movable to shift said further brushes inwardly toward said side surfaces and outwardly therefrom in directions transverse to the direction of displacement of said frame.

3. The improvement defined in claim 2 wherein said support members are respective trolleys carried by said frame and tending to shift said further brushes inwardly, further comprising a respective counterweight flexibly connected to each of said trolleys for facilitating the outward displacement of said further brushes.

4. The improvement defined in claim 2 wherein the axes of said further brushes converge upwardly so that said further brushes are biased by their weight against the side surfaces of the vehicle.

5. In an apparatus for washing automotive vehicles wherein brush means sweep along top and side surfaces of a vehicle while said surfaces are treated with the washing liquid, the improvement which comprises:

an upright support frame lying in a plane transverse to the vehicle and provided with wheel means for longitudinal displacement of said frame along said vehicle while said vehicle remains stationary;

a first brush mounted on said frame for rotation about a substantially horizontal axis and extending athwart said frame for engagement with said top surface of said vehicle upon displacement of said frame therealong;

guide means on said frame for confining said first brush to linear vertical movement substantially solely by the reaction force of rolling engagement thereof with said top surface of said vehicle during longitudinal displacement of said frame;

counterweight means on said frame and flexible means connecting said counterweight means with said first brush for balancing at least part of the weight thereof;

a pair of second brushes mounted on said frame for rotation about respective generally upright axes and engageable with respective opposite side surfaces of said vehicle;

respective support members on said frame and carrying said second brushes while being movable to shift said second brushes inwardly toward said side surfaces and outwardly therefrom in directions transverse to the direction of displacement of said frame, said second brushes being biased against said vehicle with pressures differing with respect to the direction of longitudinal displacement of said frame along said vehicle;

fluid-responsive means acting on said support members for maintaining the pressure of engagement of said second brushes with said side surfaces substantially constant; and drive means on said frame for rotating said brushes about their axes.

6. The improvement defined in claim 5 wherein said support members are displaceable from a position of said second brushes proximal to said plane and wherein said second brushes are engageable with an end face of the vehicle to a position in which the respective second brush engages the respective side surface of the vehicle.

7. The improvement defined in claim 6 wherein said support members are arms swingably mounted on said frame, said second brushes having centrifugally spreadable bristles.

References Cited by the Examiner

UNITED STATES PATENTS

| 2,381,054 | 8/1945 | Holmes | 15—53 |
| 2,579,866 | 12/1951 | Rousseau | 15—21 |
| 2,646,586 | 7/1953 | Foutes | 15—97 |
| 2,705,810 | 4/1955 | McDermott | 15—21 |

FOREIGN PATENTS

| 497,422 | 11/1953 | Canada. |
| 1,236,015 | 6/1960 | France. |
| 349,180 | 11/1960 | Switzerland. |

CHARLES A. WILLMUTH, *Primary Examiner.*

EDWARD L. ROBERTS, *Assistant Examiner.*